(No Model.)
W. N. DE GROAT.
ROTARY PUMP.
No. 266,019. Patented Oct. 17, 1882.
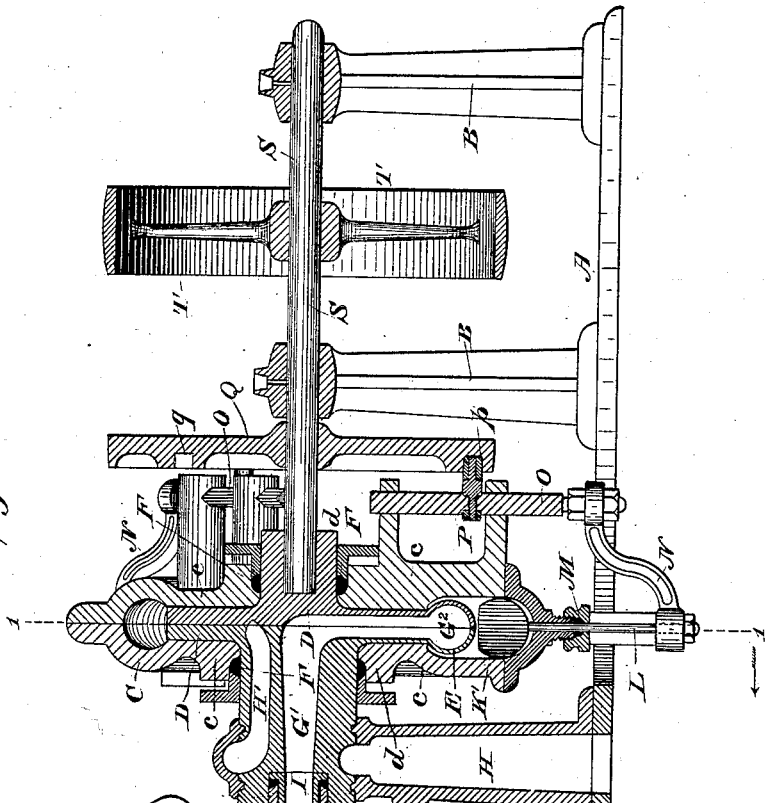
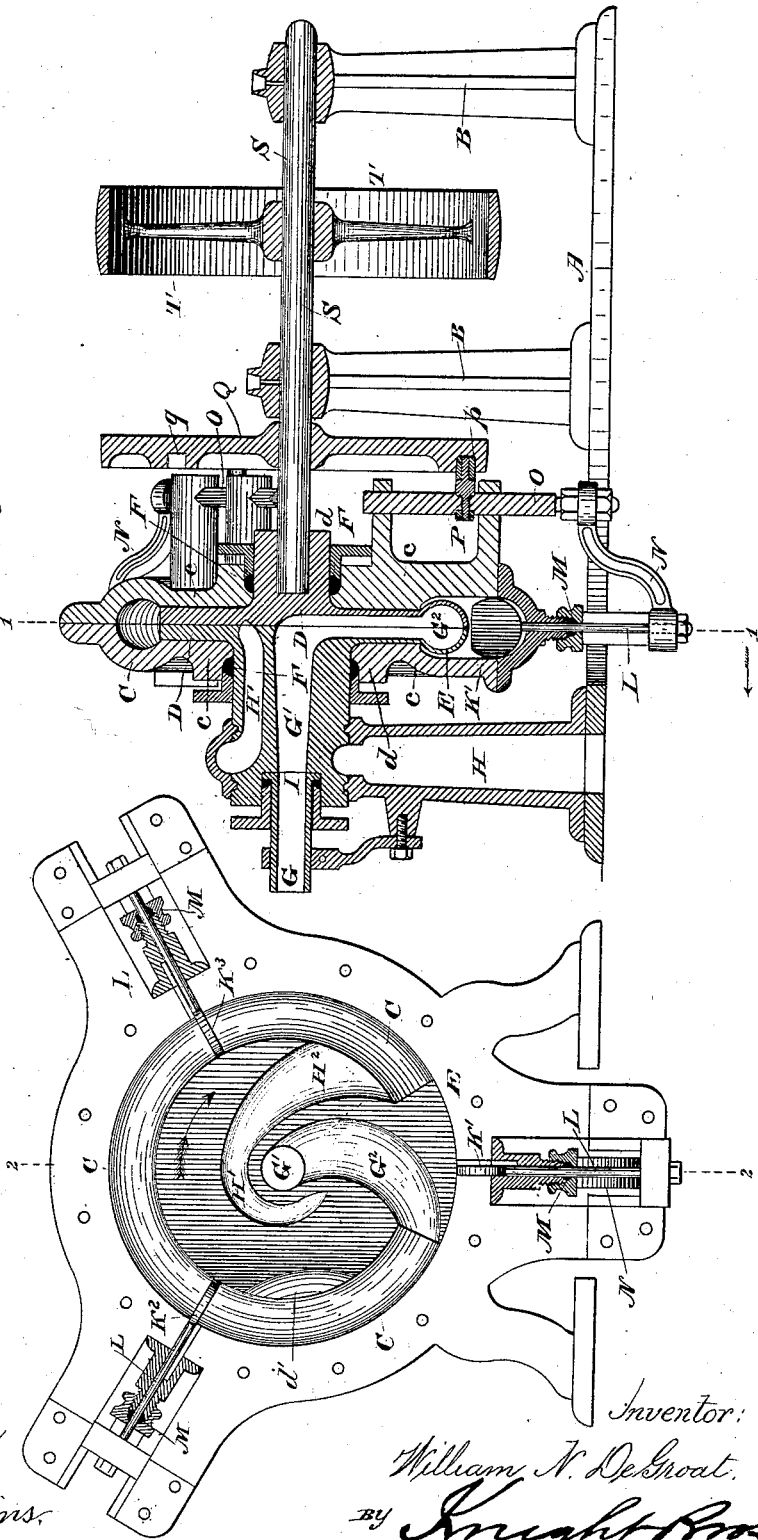
Attest:
Geo. T. Smallwood, Jr.
L. M. Hopkins.
Inventor:
William N. DeGroat.
By Knight Bros
attys.

UNITED STATES PATENT OFFICE.

WILLIAM N. DE GROAT, OF KNOXVILLE, TENNESSEE, ASSIGNOR OF ONE-HALF TO A. L. MAXWELL, OF SAME PLACE.

ROTARY PUMP.

SPECIFICATION forming part of Letters Patent No. 266,019, dated October 17, 1882.

Application filed October 21, 1881. (No model.)

*To all whom it may concern:*

Be it known that I, WILLIAM NELSON DE GROAT, a citizen of the United States, residing at Knoxville, in the county of Knox and State of Tennessee, have invented a new and useful Improvement in Rotary Pumps, of which the following is a specification.

My improved pump is constructed with a disk mounted upon a driving-shaft, said disk carrying one or more piston-heads, which work in a stationary annular cylinder formed with webs or plates extending inwardly in contact with the respective faces of the disk to the journals thereof, where suitable glands or stuffing-boxes are provided for packing the joints. The disk is further provided with inlet and outlet passages concentrically arranged on one or both of its sides, passing to the periphery by radial or nearly radial ports or ducts communicating with the interior of the annular cylinder on opposite sides of the piston-head, the central passage being in line with the shaft, while the concentric passage surrounding the same communicates with a port in vertical or other position radial to the journal of the revolving disk, as hereinafter described. The radial port may be the inlet and the axial port the outlet, or vice versa, as preferred. The inlet and outlet ports communicate with the stationary annular cylinder on opposite sides of the traveling piston-head of the revolving disk. I prefer to use three radially-sliding abutments to a disk having one piston-head. The invention may be used with two piston-heads on the rotary disk and a corresponding number of inlet and outlet ports, and with four radially-sliding abutment-heads in the annular cylinder.

In order that my invention may be fully understood, I will proceed to describe it with reference to the accompanying drawings, in which—

Figure 1 is a vertical transverse section of the pump on the line 1 1, Fig. 2. Fig. 2 is a vertical longitudinal section thereof on the line 2 2, Fig. 1.

A represents a suitable base or bed, on which the standards or pillow-blocks B B and the annular cylinder C are fastened. The main shaft S has its bearings on the pillow-blocks B B, and is driven by a pulley, T, or other means.

On its end is keyed a disk, D, on which are one or more piston-heads, E, fitting within the annular cylinder C.

F F are glands or stuffing-boxes, packing the journals $d\ d$ of the disk D against the webs or plates $c\ c$, which extend inwardly from the cylinder C to the said journals.

G represents a stationary discharge-pipe communicating with the center of the disk D through an axial port, G′, in the hub, and thence through a radial port, G″, with the cylinder in front of the piston E.

H is the inlet-pipe, which communicates constantly with an annular port, H′, in the disk surrounding the central outlet-port, G′, and communicating through a radial port, H″, with the cylinder in rear of the piston E.

The pipe G is confined and the joint between it and the rotary disk D packed by means of a gland, I.

K′ K² K³ are the radially-sliding abutments, which are operated by rods L, passing through stuffing-boxes M, and connected by arms N to radially-sliding rods O, having studs P, on which are rollers $p$, which travel in the cam-groove $q$ of a wheel, Q, keyed on the main shaft S. The abutments may, however, be operated by any other suitable means. A depression, $d'$, is formed in the periphery of the disk D a short distance in advance of the piston E to permit the passage of water beneath each abutment-head K′ K² K³ just before the piston reaches that point. The pressure on the opposite faces of each abutment-head is thus equalized before the time comes for it to recede. The form of the cam-groove $q$ adapts it to withdraw each abutment-head from in front of the piston as soon as the pressure on its faces is thus balanced and to restore it to its closed or inner position as soon as the piston and inlet-port H″ have passed. In the position shown in Fig. 1 the piston is forcing the water from the space between its face and the abutment-head K², the cylinder-spaces from K′ to K², from K² to K³, and from K³ to the back of the piston E having been successively filled by the water entering at normal or atmospheric pressure through the induction-port H, the spaces being thus kept constantly full.

As soon the depression $d'$ reaches the abutment-head $K^2$ the forcing-pressure is transferred from $K^2$ to $K^3$, and so the forcing of the water is continuous without pulsation or intermission.

The pipe H may extend from the center in any radial or other direction and to any desired point.

The inlet and outlet passages may be conducted into the disk D at any point out of the center by the use of a casing concentric with the shaft and suitable concentric grooves therein and in the face of the disk.

The pipe G may be used as the inlet and the pipe H as the outlet, if preferred.

The pump may be run in either direction, and when in the reverse direction from that indicated by the arrow in Fig. 1 the port $H^2$, being in advance of the piston, may serve the purpose of the passage $d'$ in equalizing the pressure on both sides of the sliding abutments in succession; or the ports $G^2$ and $H^2$ may both open on the faces of the piston, the passages $d'$ being duplicated on each side of the piston.

The operation of the device, as shown in the drawings, is as follows: The shaft S is rotated by the pulley T being connected with a suitable motor, which rotates the disk D, carrying the piston E. This action causes liquid to be drawn through the pipe H and ports $H'$ and $H^2$ into the cylinder in rear of the piston, filling the space between the piston and abutment $K^3$, and the continued movement of the piston forces the liquid between the piston and abutment $K^2$ into the discharge-pipe G by way of ports $G^2$ and $G'$.

Having thus described my invention, the following is what I claim as new therein and desire to secure by Letters Patent:

1. The combination of the shaft S, the rotary disk D, having one or more piston-heads, E, the cylinder C, and sliding abutments $K'$ $K^2$ $K^3$, all constructed and operating substantially as and for the purposes herein described.

2. The rotary disk constructed with one or more depressions for equalizing the pressure on opposite sides of the radial abutments before said abutments are moved, as set forth.

3. The combination of the revolving disk D and the annular cylinder E, extending inward in webs or plates $c$ $c$ on either side or face of the disk, and packed at the journals thereof by suitable glands, as herein set forth.

W. N. DE GROAT.

Witnesses:
   CHAS. H. BROWN,
   W. C. FEATHERSTON.